(12) United States Patent
Ujiyama et al.

(10) Patent No.: US 10,801,989 B2
(45) Date of Patent: Oct. 13, 2020

(54) A/F SENSOR AND METHOD OF MANUFACTURING THE SAME

(71) Applicant: DENSO CORPORATION, Kariya, Aichi-pref (JP)

(72) Inventors: Tatsuki Ujiyama, Aichi-pref (JP); Yasufumi Suzuki, Aichi-pref (JP)

(73) Assignee: DENSO CORPORATION, Kariya (JP)

( * ) Notice: Subject to any disclaimer, the term of this patent is extended or adjusted under 35 U.S.C. 154(b) by 311 days.

(21) Appl. No.: 15/754,373

(22) PCT Filed: Aug. 29, 2016

(86) PCT No.: PCT/JP2016/075136
§ 371 (c)(1),
(2) Date: Feb. 22, 2018

(87) PCT Pub. No.: WO2017/034037
PCT Pub. Date: Mar. 2, 2017

(65) Prior Publication Data
US 2018/0238826 A1    Aug. 23, 2018

(30) Foreign Application Priority Data

Aug. 27, 2015  (JP) ................................ 2015-168050
Jun. 7, 2016   (JP) ................................ 2016-113841

(51) Int. Cl.
*G01N 27/409* (2006.01)
*C04B 35/48* (2006.01)
(Continued)

(52) U.S. Cl.
CPC ........... *G01N 27/409* (2013.01); *C04B 35/48* (2013.01); *C04B 35/622* (2013.01); *F01N 3/24* (2013.01);
(Continued)

(58) Field of Classification Search
CPC .... G01N 27/4073; C04B 35/48; C04B 35/622
See application file for complete search history.

(56) References Cited

U.S. PATENT DOCUMENTS 4,021,326 A * 5/1977 Pollner .............. G01N 27/4075
                                                    204/429
4,152,234 A * 5/1979 Pollner ................. C04B 35/486
                                                    204/427
(Continued)

FOREIGN PATENT DOCUMENTS

JP    7-198674    8/1995
JP    10-87366    4/1998
(Continued)

OTHER PUBLICATIONS

EPO machine-generated English language translation of the Description section of Jp 2003-4696 A, patent published Jan. 8, 2003 (Year: 2003).*

(Continued)

*Primary Examiner* — Alexander S Noguerola
(74) *Attorney, Agent, or Firm* — Nixon & Vanderhye P.C.

(57) ABSTRACT

An A/F sensor includes a solid electrolyte body and a heater. The A/F sensor is disposed downstream of a purification device in a flow of exhaust gas g. The purification device purifies the exhaust gas g. The solid electrolyte body is in a cup shape. The solid electrolyte body has an outer surface provided with a measurement electrode 4 contacting the exhaust gas g, and an inner surface provided with a reference electrode contacting reference gas. The solid electrolyte body is made of zirconia. The solid electrolyte body includes a detection part sandwiched between the measurement electrode and the reference electrode and conducted with oxygen ions. The detection part has a cubic phase ratio of 88 mol % or more.

13 Claims, 11 Drawing Sheets

(51) Int. Cl.
 *G01N 27/407* (2006.01)
 *C04B 35/622* (2006.01)
 *F01N 3/24* (2006.01)
 *F01N 11/00* (2006.01)

(52) U.S. Cl.
 CPC ....... *F01N 11/007* (2013.01); *G01N 27/4073* (2013.01)

(56) References Cited

U.S. PATENT DOCUMENTS

| | | | |
|---|---|---|---|
| 4,626,337 A | | 12/1986 | Hotta et al. |
| 4,693,076 A | * | 9/1987 | Chujo ................. F02D 41/1441 123/691 |
| 4,784,743 A | * | 11/1988 | Iino .................... G01N 27/4065 204/425 |
| 6,174,489 B1 | * | 1/2001 | Kobayashi ......... G01N 27/4073 264/618 |
| 6,202,469 B1 | | 3/2001 | Nakamura et al. |
| 6,258,233 B1 | | 7/2001 | Sugiyama et al. |
| 2013/0306475 A1 | | 11/2013 | Suzuki et al. |
| 2015/0293051 A1 | | 10/2015 | Kajiyama et al. |
| 2016/0290953 A1 | | 10/2016 | Sakimoto et al. |

FOREIGN PATENT DOCUMENTS

| | | |
|---|---|---|
| JP | 2003-4696 | 1/2003 |
| JP | 2011-242145 | 12/2011 |

OTHER PUBLICATIONS

E. R. Andrievskaya, Phase equilibria in the refractory oxide systems of zirconia, hafnia an yttria with rare-earth oxides, Journal of the European ceramic Society 28 (2008) 2363-2388 (Year: 2008).*

H. G. Scott, "Phase relationships in the zirconia-yttria system," Journal of Materials Science 10 (1975) 1527-1535 (Year: 1975).*

Jeffrey J. Swab, Role of Oxide Additives in Stabilizing Zirconia for Coating Applications, Army Research Laboratory ARL-TR-2591 Sep. 2001 (Year: 2001).*

Cezairliyan et al., Thermodynamic Studies of the $\alpha \rightarrow \beta$ Phase Transformation in Zirconium Using a Subsecond Pulse Heating Technique, Journal of Research of the National Bureau of Standards A. Physics and Chemistry vol. 79A, No. 1, Jan.-Feb. 1974 (Year: 1974).*

* cited by examiner

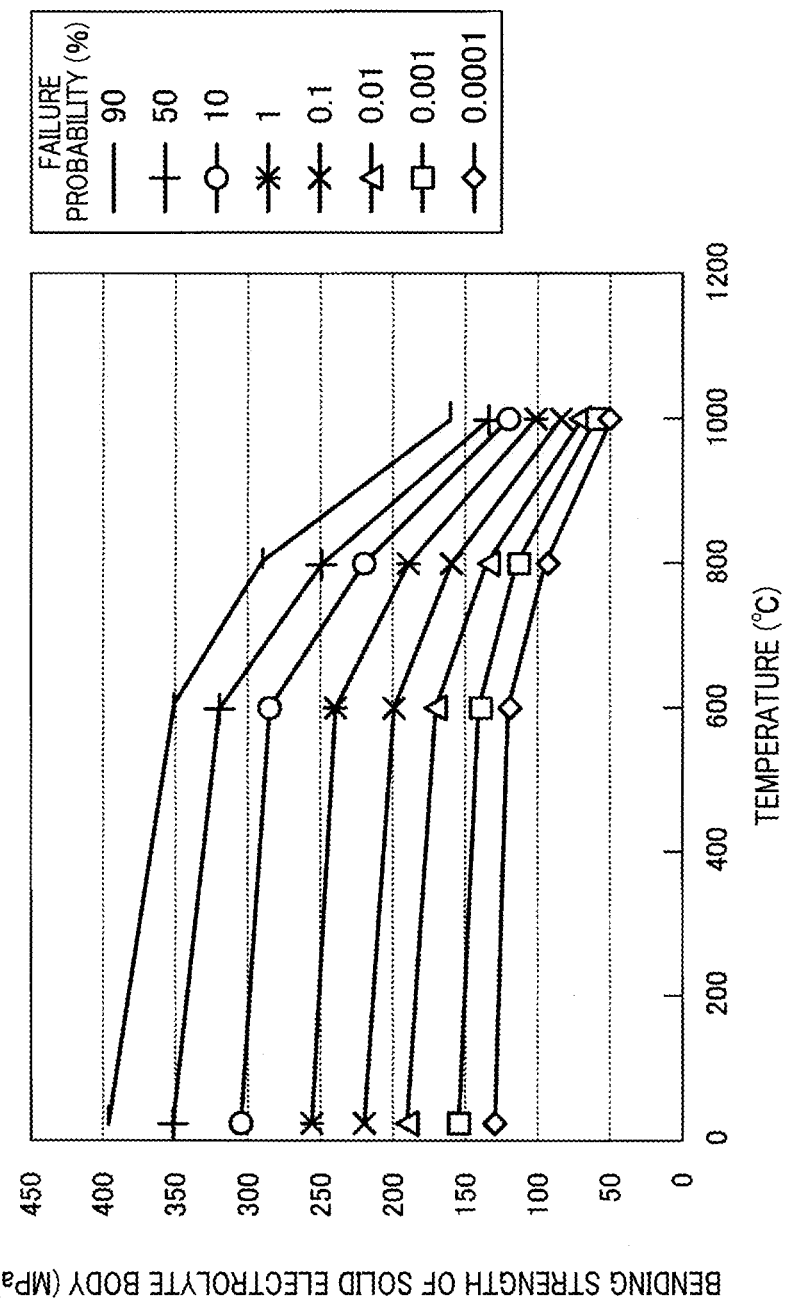

A/F SENSOR AND METHOD OF MANUFACTURING THE SAME

This application is the U.S. national phase of International Application No. PCT/JP2016/075136 filed on Aug. 29, 2016 which designated the U.S. and claims the benefit of priority from earlier Japanese Patent Application Nos. 2015-168050 filed on Aug. 27, 2015, and 2016-113841 filed on Jun. 7, 2016, the entire contents of each of which are incorporated herein by reference.

TECHNICAL FIELD

The present disclosure relates to an A/F sensor for measuring an air-fuel ratio of exhaust gas and a method of manufacturing the A/F sensor.

BACKGROUND ART

A/F sensors for measuring an air-fuel ratio of exhaust gas are available. Some A/F sensors are known to have a configuration that is provided with a solid electrolyte body having oxygen ion conductivity (see PTL 1). The solid electrolyte body is, for example, made of zirconia and is formed into a plate shape or a cup shape. The solid electrolyte body has a first surface provided with a measurement electrode that is in contact with the exhaust gas. The solid electrolyte body has a second surface provided with a reference electrode that is in contact with a reference gas, such as atmospheric air.

Part of the solid electrolyte body forms a detection part sandwiched between the measurement electrode and the reference electrode. In such an A/F sensor, when the detection part is heated to an activation temperature, oxygen ions move through the detection part from the reference electrode to the measurement electrode, or vice versa. Current generated during the oxygen ion movement is measured to measure an oxygen concentration in the exhaust gas and calculate an air-fuel ratio.

A/F sensors are used for engine control systems such as for vehicles. In an engine control system, the engine is feedback-controlled based on an air-fuel ratio measured by the A/F sensor. With this configuration, the air-fuel ratio of the exhaust gas is controlled, and harmful substances in the exhaust gas are ensured to be reduced.

Such an A/F sensor is attached to the exhaust pipe of an engine. The exhaust pipe is provided with a purification device for purifying the exhaust gas. The A/F sensor is often provided upstream of the purification device in the exhaust gas flow.

In recent years, development is underway for further reduction of harmful substances in exhaust gas. To this end, it is considered to be effective to control the air-fuel ratio of exhaust gas with higher accuracy. For example, the A/F sensor may be disposed not only upstream but also downstream of the purification device. Using the downstream A/F sensor, the air-fuel ratio of the exhaust gas that has passed through the purification device may be controlled with higher accuracy. Accordingly, harmful substances contained in the exhaust gas that has passed through the purification device may be reduced more.

CITATION LIST

Patent Literature

[PTL 1] JP 2014-122878 A

SUMMARY OF THE INVENTION

Technical Problem

However, it has been difficult for the downstream A/F sensors of conventional art to obtain an air-fuel ratio with high measurement accuracy required of them. Specifically, in the A/F sensors of conventional art, electrical resistance of the detection parts is relatively high. When the detection parts have high electrical resistance, a value of resistance of the detection parts tends to vary between A/F sensors. Accordingly, current flowing through the detection parts tends to vary between A/F sensors, so that the measurement accuracy of air-fuel ratio is likely to be impaired.

The present disclosure has an object to provide an A/F sensor disposed downstream of a purification device in an exhaust gas flow and capable of more accurately measuring an air-fuel ratio of the exhaust gas, and a method of manufacturing the A/F sensor.

Solution to Problem

A first aspect of the technique of the present disclosure is an A/F sensor (1) disposed downstream of an exhaust gas purification device (10) in an exhaust gas flow to measure an air-fuel ratio of the exhaust gas, including: a cup-shaped solid electrolyte body (2) closed at a tip end and opened at a base end; a reference gas chamber (3) formed inside the solid electrolyte body for introduction of reference gas; a measurement electrode (4) formed on an outer surface (21) of the solid electrolyte body to be in contact with the exhaust gas; a reference electrode (5) formed on an inner surface (22) of the solid electrolyte body to be in contact with the reference gas; and a heater (6) disposed in the reference gas chamber to heat the solid electrolyte body. In the A/F sensor, the solid electrolyte body is made of zirconia; the solid electrolyte body includes a detection part (20) interposed between the measurement electrode and the reference electrode to conduct oxygen ions; and the detection part has a cubic phase ratio of 88 mol % or more.

A second aspect of the technique of the present disclosure is a method of manufacturing the A/F sensor including: a step of firing an unsintered body (28) of the solid electrolyte body to produce a sintered body (29); and a step of applying current across the measurement electrode and the reference electrode formed on the sintered body to increase ratio of the cubic phase to 88 mol % or more in the detection part.

Advantageous Effects of the Invention

As a result of intensive study for solving the aforementioned problems, the present inventors have found that when the cubic phase ratio of the aforementioned detection part is 88 mol % or more, the electrical resistance of the detection part is significantly reduced, and variation in the electrical resistance is also reduced. Specifically, zirconia crystal has a cubic phase (may be termed C phase hereinafter), a monoclinic phase (may be termed M phase hereinafter), and a tetragonal phase (may be termed T phase hereinafter). M and T phases exhibit high electrical resistance, but C phase exhibits low electrical resistance. Accordingly, in the A/F sensor of the present disclosure, the amount of C phase in the detection part is sufficiently increased to lower the electrical resistance of the detection part. Thus, variation in electrical resistance of the detection part is reduced, and thus variation in current flowing through the detection part is reduced. Thus, the air-fuel ratio of exhaust gas is measured with high accuracy. In the A/F sensor of the present disclosure, air-fuel ratio of exhaust gas is controlled with higher accuracy, and harmful substances in the exhaust gas are reduced more.

In the second aspect of the technique of the present disclosure, the steps of firing and energization are performed.

It is difficult to increase C-phase ratio of the detection part to 88 mol % or more by merely performing the firing step. However, the energization step of applying current across the measurement electrode and the reference electrode can easily increase C phase to 88 mol % or more in the detection part. Thus, in the method of manufacturing a sensor according to the present disclosure, the A/F sensor is easily manufactured.

As described above, the technique of the present disclosure can provide the A/F sensor that is disposed downstream of the purification device in the exhaust gas flow and capable of more accurately measuring an air-fuel ratio of the exhaust gas, and a method of manufacturing the A/F sensor.

It should be noted that reference signs in parentheses in the Claims and in the Solution to Problem indicate correspondency to specific means in the embodiments described later. These reference signs should not limit the technical scope of the present disclosure.

BRIEF DESCRIPTION OF THE DRAWINGS

FIG. 11 is a graph showing a relationship between bending strength of the solid electrolyte body and temperature, for each failure probability, according to a fifth experimental example.

DESCRIPTION OF EMBODIMENTS

An A/F sensor of the present disclosure is applicable to an on-vehicle sensor for measuring an air-fuel ratio of exhaust gas emitted from an engine of the vehicle.

(First Embodiment)

Figure 2:
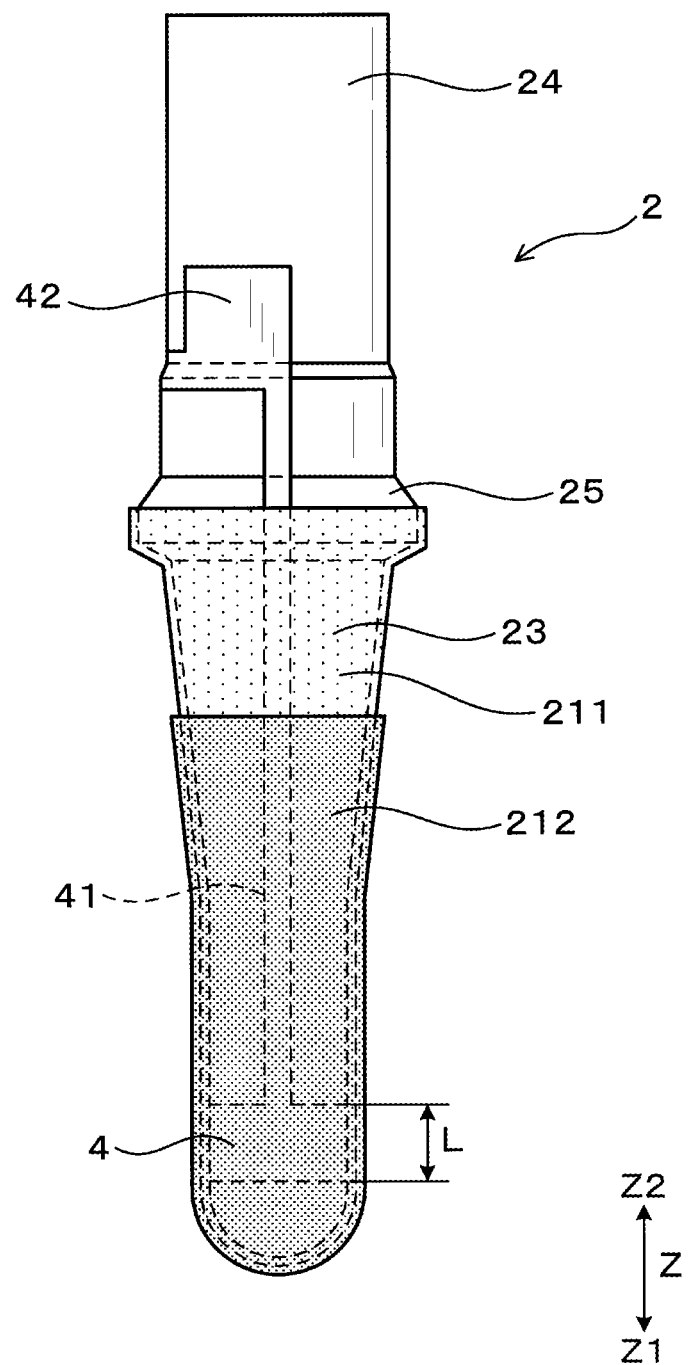
FIG. 2 is a side view illustrating the solid electrolyte body, according to the first embodiment.
Figure 3:
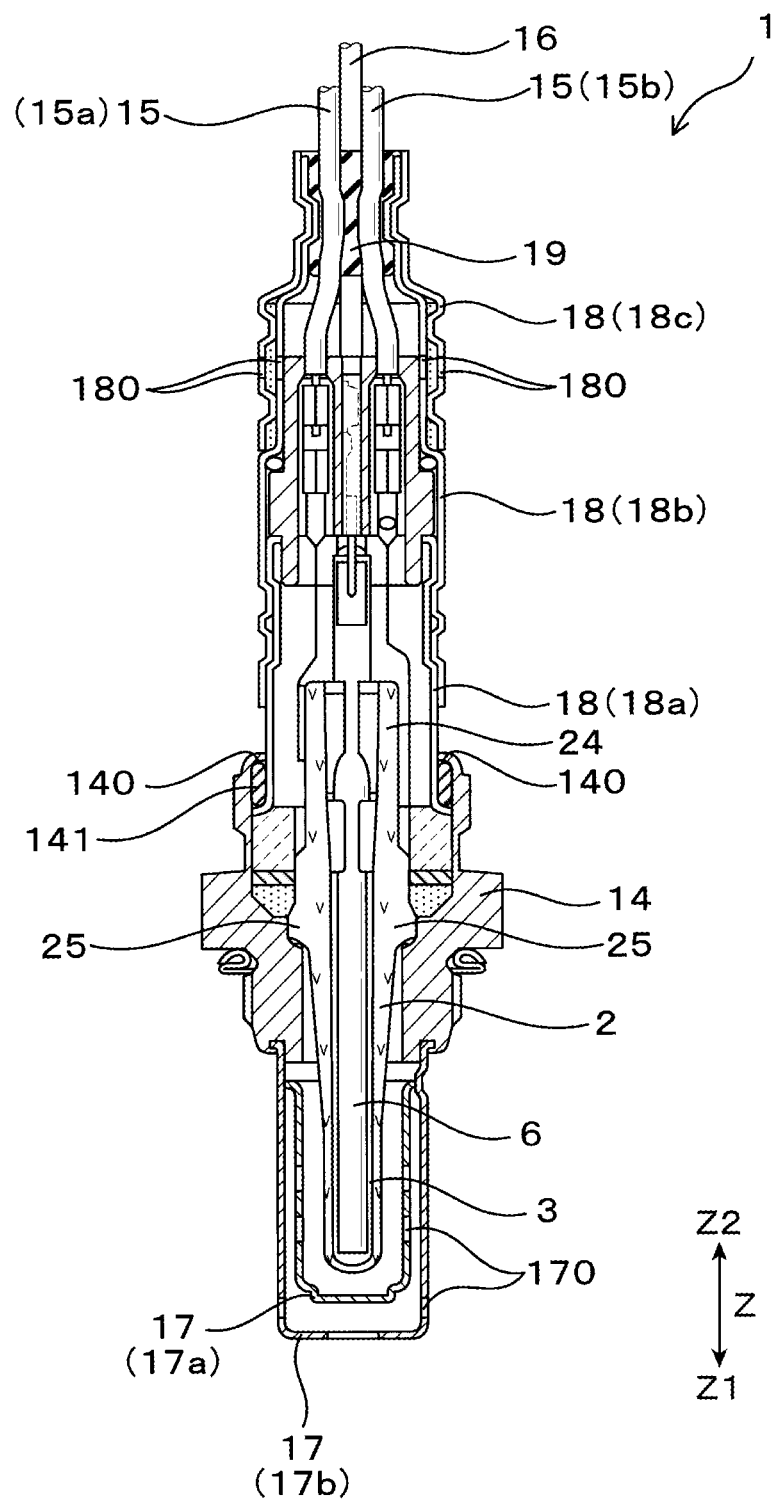
FIG. 3 is a sectional view illustrating an A/F sensor, according to the first embodiment.
Figure 4:
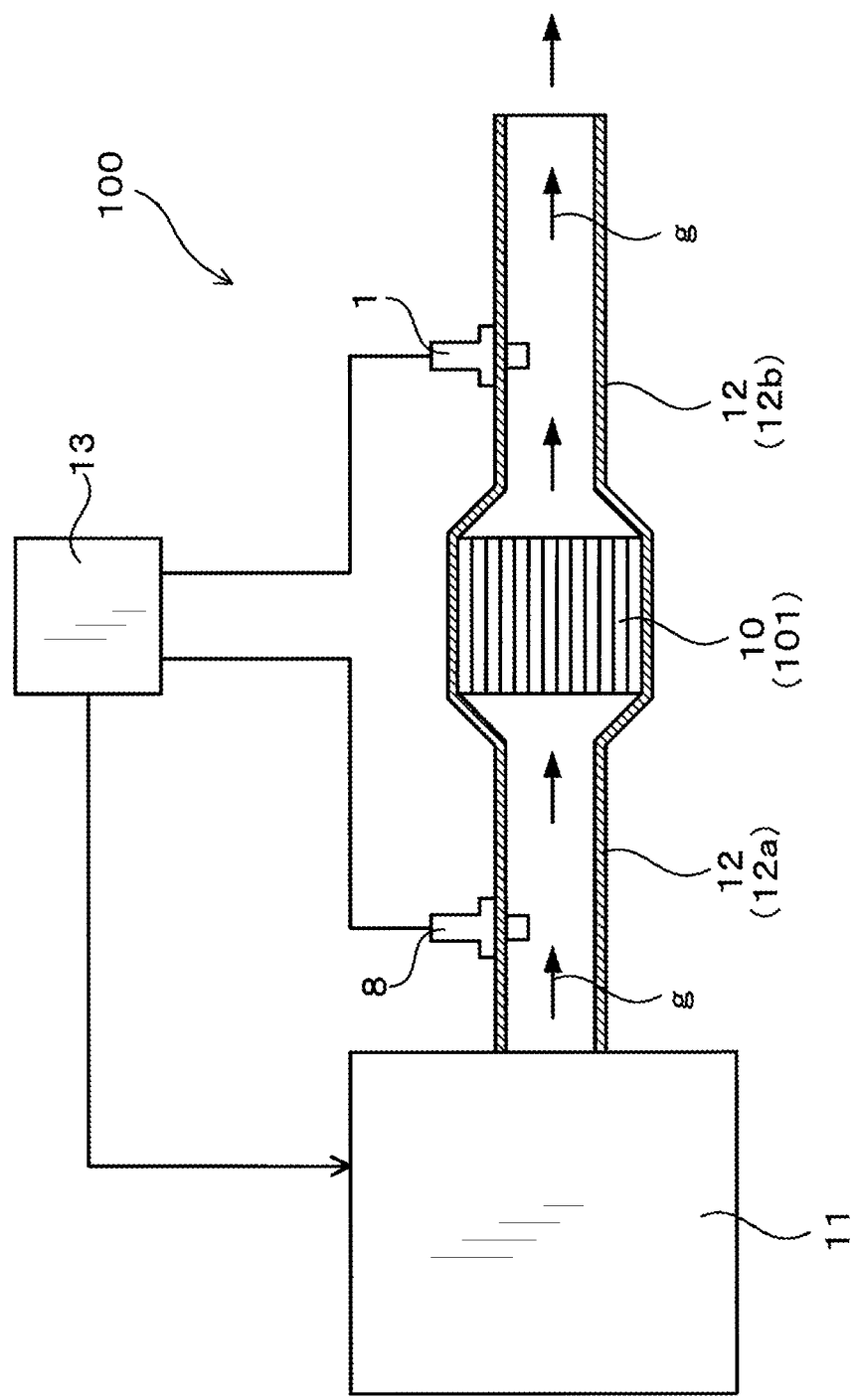
FIG. 4 is a diagram illustrating an attachment position of the A/F sensor, according to the first embodiment.

With reference to FIGS. 1 to 5, an embodiment of an A/F sensor of the present disclosure will be described. In the following description, the term "tip end side" refers to "nearer the tip end" of the A/F sensor in the axial direction thereof (Z1 side in a Z-direction), that is, "nearer the tip end" where the sensor is exposed to exhaust gas that is a gas to be measured. The term "base end side" refers to "nearer an end opposite to the tip end" (Z2 side in the Z-direction). As shown in FIG. 4, an A/F sensor 1 of the present embodiment is disposed downstream of a purification device 10 in a flow of exhaust gas g in a circulation path of the exhaust gas g. The purification device 10 purifies the exhaust gas g. The A/F sensor 1 is provided to measure an air-fuel ratio of the exhaust gas g.

As shown in FIG. 3, the A/F sensor 1 includes a solid electrolyte body 2 and a heater 6. The solid electrolyte body 2 is formed into a cup shape which is closed at a tip end and opened at a base end. A reference gas chamber 3 into which a reference gas, such as atmospheric air, is introduced is formed on the inside of the solid electrolyte body 2. The heater 6 is disposed in the reference gas chamber 3.

Figure 1:
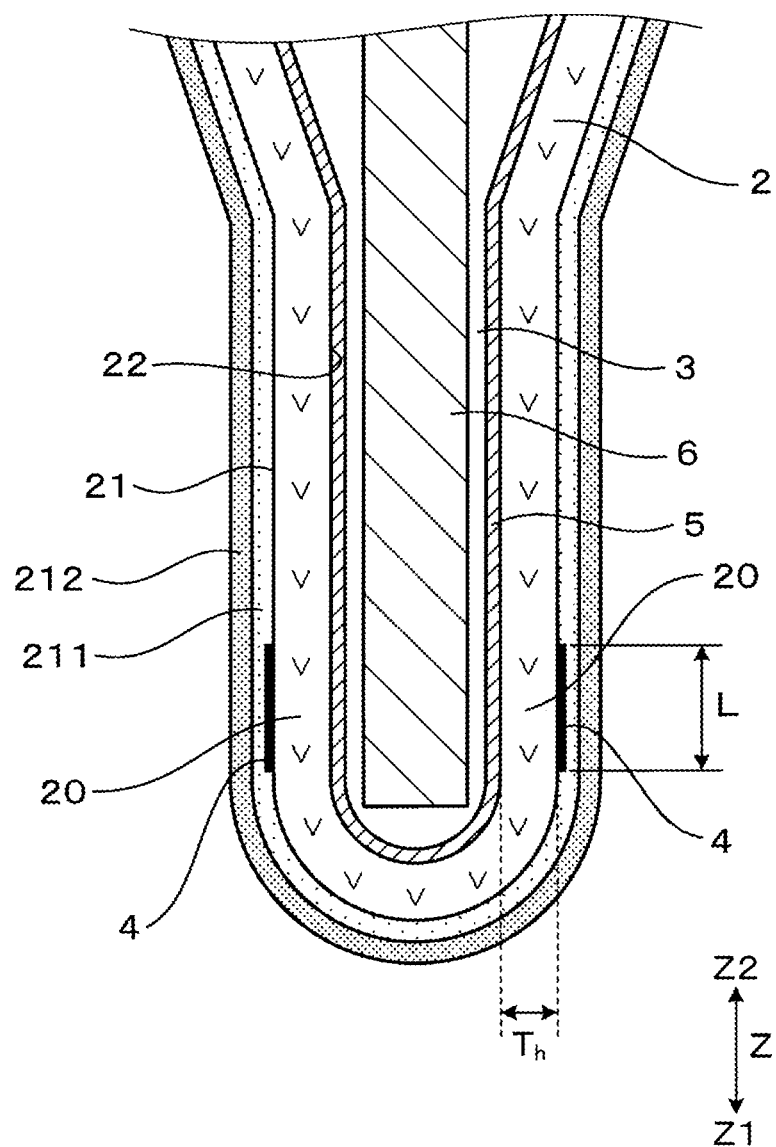
FIG. 1 is an enlarged sectional view illustrating a main portion of a solid electrolyte body, according to a first embodiment.

As shown in FIG. 1, the solid electrolyte body 2 has an outer surface 21 that is provided with a measurement electrode 4 contacting the exhaust gas g. The solid electrolyte body 2 has an inner surface 22 that is provided with a reference electrode 5 contacting the reference gas.

The solid electrolyte body 2 is made of zirconia ($ZrO_2$). The solid electrolyte body 2 includes a detection part 20 that is interposed between the measurement electrode 4 and the reference electrode 5 and configured to conduct oxygen ions therethrough. The detection part 20 has a cubic phase ratio of 88 mol % or more.

The A/F sensor 1 of the present embodiment is an on-vehicle sensor for measuring an air-fuel ratio of exhaust gas generated from the engine of the vehicle.

As shown in FIG. 2, the solid electrolyte body 2 includes a large-diameter portion 25 where the diameter is partially increased. The solid electrolyte body 2 also includes a portion 23 which is positioned on the tip end side (Z1 side in the Z-direction) with respect to the large-diameter portion 25 and is exposed to the exhaust gas g. The solid electrolyte body 2 also includes an output extractor 24 positioned on the base end side (Z2 side in the Z-direction) with respect to the large-diameter portion 25. The output extractor 24 is not exposed to the exhaust gas g. The output extractor 24 has an outer surface on which a terminal portion 42 is formed. The measurement electrode 4 and the terminal portion 42 are connected to each other through a lead portion 41.

The measurement electrode 4 is formed into an annular shape to surround the solid electrolyte body 2. The measurement electrode 4 has a length L (see FIG. 1) in the axial direction (Z-direction) of the solid electrolyte body 2. The length L is set to 3 mm or less. In the present embodiment, the reference electrode 5 is formed entirely covering the inner surface 22 of the solid electrolyte body 2. The measurement electrode 4 and the reference electrode 5 are made of platinum (Pt).

As shown in FIG. 1, the outer surface 21 of the solid electrolyte body 2 is provided with a diffusion layer 211 and a trap layer 212. The diffusion layer 211 and the trap layer 212 cover the measurement electrode 4. The diffusion layer 211 is made of aluminum oxide, magnesium oxide, and spinel (alumina-magnesia spinel), and the trap layer 212 is made of porous alumina. The exhaust gas g comes into contact with the measurement electrode 4 through the diffusion layer 211 and the trap layer 212. The diffusion layer 211 is provided to control the diffusion rate of the exhaust gas g. The trap layer 212 is provided to trap poisonous substances in the exhaust gas g.

In the A/F sensor 1, when the detection part 20 is heated to an activation temperature by the heater 6 (see FIG. 3) and when the exhaust gas g is rich, oxygen ions move from the reference electrode 5 to the measurement electrode 4 through the solid electrolyte body 2. When the exhaust gas g is lean, oxygen ions move from the measurement electrode 4 to the reference electrode 5. During the movement of oxygen ions, the A/F sensor 1 is ensured to measure current flowing between the measurement electrode 4 and the reference electrode 5, for measurement of an oxygen concentration in the exhaust gas g and for calculation of the air-fuel ratio of the exhaust gas g.

As described above, the detection part 20 of the solid electrolyte body 2 of the present embodiment includes 88 mol % or more of C phase. The rest of the solid electrolyte body 2 includes less than 88 mol % of C phase. More specifically, the C phase is 87 mol % or less. The solid electrolyte body 2 of the present embodiment contains 4.5 to 6 mol % of yttrium oxide ($Y_2O_3$).

In the present embodiment, the detection part 20 has an area of 20 to 40 $mm^2$, and has a thickness Th of 0.5 to 2 mm.

Figure 5:
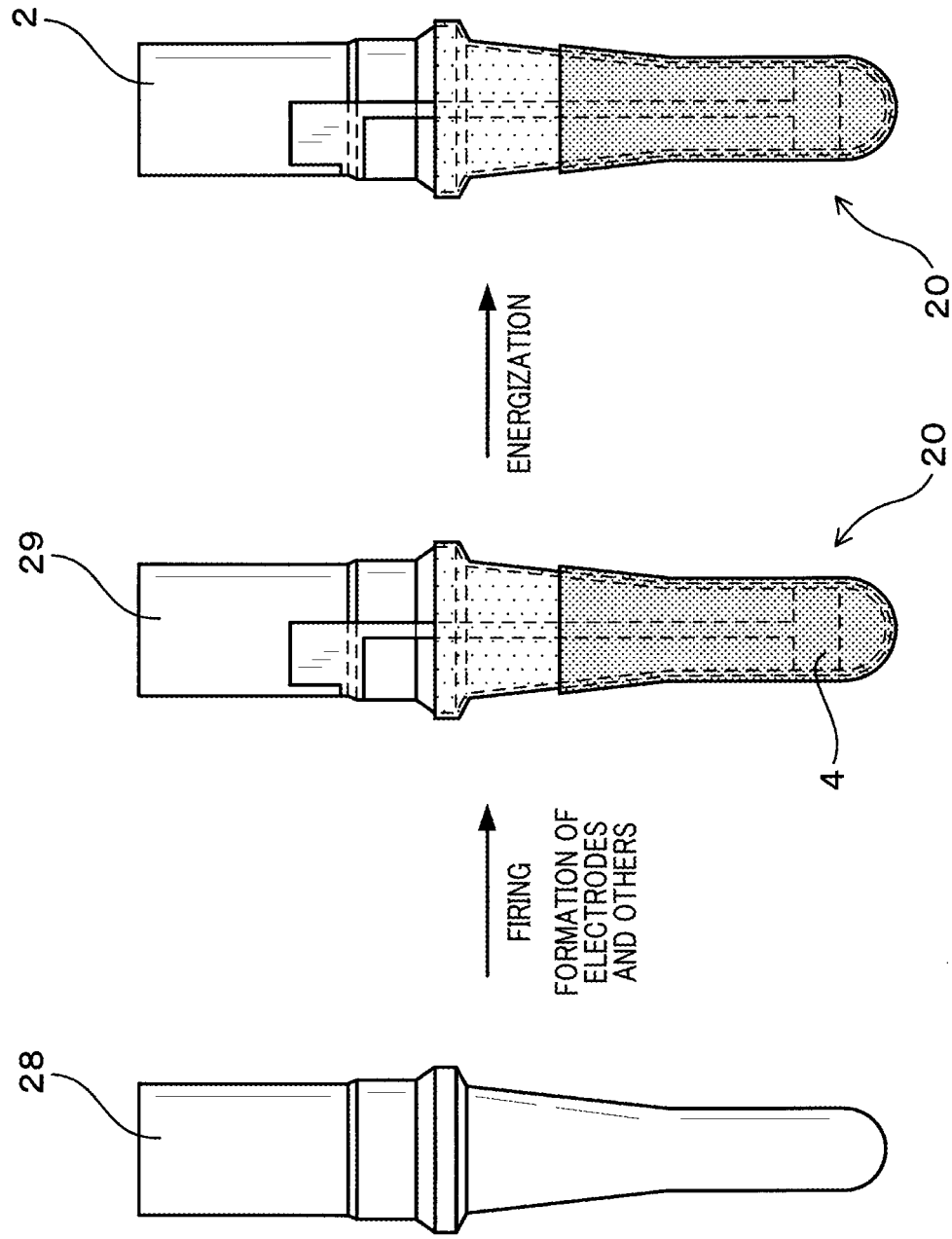
FIG. 5 is a set of diagrams illustrating steps of producing samples, according to the first embodiment.

A method of manufacturing the solid electrolyte body 2 will be described. To manufacture the solid electrolyte body 2, steps as shown in FIG. 5 are taken. In the present manufacturing method, $ZrO_2$ powder and $Y_2O_3$ powder are mixed together first, and are formed into a cup shape to thereby prepare an unsintered body 28 of the solid electrolyte body 2. Then, the unsintered body 28 is fired (firing step). The resultant sintered body 29 is then plated to form a measurement electrode 4 and a reference electrode 5. Thereafter, the surface of the sintered body 29 is plasma-sprayed for formation of a diffusion layer 211, and then a slurry is applied onto the diffusion layer 211 for formation of a trap layer 212, followed by drying and firing.

In the sintered body 29, C-phase ratio is usually 87 mol % or less throughout the entirety of the sintered body 29. For example, the sintered body 29 can be formed by the following method. Specifically, when the unsintered body 28 is composed of 94% of $ZrO_2$ and 6% of $Y_2O_3$ and is fired for about 24 hours at 1100° C., the resultantly formed sintered body 29 has a C-phase ratio of 87 mol % throughout the entirety.

Then, in the present manufacturing method, a heater 6 is disposed in the sintered body 29 to heat the sintered body 29 while current is applied across the measurement electrode 4 and the reference electrode 5 (energization step). At the energization step, for example, a current of 260 mA is applied across the measurement electrode 4 and the reference electrode 5 with the temperature of the detection part 20 being set to 850° C. This energization achieves a change in the crystal structure of the detection part 20 and increases C-phase ratio. In the present manufacturing method, the energization step is performed for a predetermined period of time to achieve a C-phase ratio of 88 mol % or more in the detection part 20.

When measuring the air-fuel ratio of the exhaust gas g using the A/F sensor 1, the detection part 20 is heated by the heater 6 up to 600 to 1000° C. When measuring air-fuel ratio, current passing through the detection part 20 is very small (current flow is small). Thus, the C-phase ratio remains unchanged while the air-fuel ratio is measured. In contrast, at the energization step, the temperature of the detection part 20 is set to 850° C., and current greater than that in measuring air-fuel ratio is applied to the detection part 20 (current of several hundred mA). Application of such a large current achieves a change in the crystal structure of the detection part 20 and increases the C-phase ratio.

The following description deals with an overall structure of the A/F sensor 1. As shown in FIG. 3, the A/F sensor 1 includes the solid electrolyte body 2, a housing 14, wires 15 (15a, 15b), a heater wire 16, covers 17 (17a, 17b), atmosphere covers 18 (18a to 18c), and a seal portion 19. The solid electrolyte body 2 is fixed inside the housing 14.

Of the two wires 15 (15a, 15b), a first wire 15a is electrically connected to the terminal portion 42 (see FIG. 2). A second wire 15b is electrically connected to the reference electrode 5 formed on an inner surface of the output extractor 24. The heater wire 16 is electrically connected to the heater 6.

The solid electrolyte body 2 has a tip end which is protected by the two covers 17 (17a, 17b). The covers 17a, 17b are formed with respective openings 170. The exhaust gas g enters into the covers 17 through the openings 170.

The housing 14 is formed with a shoulder 140 in a portion that is on a base end side thereof in the axial direction (Z-direction) (Z2 side in the Z-direction). The shoulder 140 is provided with a spring member 141 disposed at a position further toward the tip end side (Z1 side in the Z-direction). In the present embodiment, the shoulder 140 is swaged to press the solid electrolyte body 2 toward the tip end side in the axial direction (Z-direction), thereby pressing the large-diameter portion 25 against the housing 14. Thus, the exhaust gas g is prevented from leaking from between the large-diameter portion 25 and the housing 14.

The three atmosphere covers 18 (18a, 18b, 18c) are provided at respective base-end-side positions of the housing 14 in the axial direction (Z-direction). The atmosphere covers 18b and 18c have a base-end-side portion where the seal portion 19 is disposed. The wires 15 and the heater wire 16 pass through the seal portion 19. In the present embodiment, the atmosphere covers 18b and 18c are swaged to secure the seal portion 19. The atmosphere covers 18b and 18c are each provided with a flow-through portion 180. In the present embodiment, atmospheric air as a reference gas is introduced into the reference gas chamber 3 from outside the A/F sensor 1 via these flow-through portions 180.

The following description deals with an attachment position of the A/F sensor 1. As shown in FIG. 4, the A/F sensor 1 of the present embodiment is mounted to an exhaust pipe 12. The exhaust pipe 12 is connected to an engine 11 (internal combustion engine), with the purification device 10 purifying the exhaust gas g being provided thereto.

In the circulation path of the exhaust gas g, the exhaust pipe 12 includes an upstream portion 12a connecting between the purification device 10 and the engine 11, and a downstream portion 12b disposed downstream of the purification device 10. The A/F sensor 1 is mounted to the downstream portion 12b of the exhaust pipe 12. The upstream portion 12a is mounted with an upstream air-fuel ratio sensor 8.

The A/F sensor 1 and the upstream air-fuel ratio sensor 8 are connected to a control circuit 13. As described above, in the present embodiment, the A/F sensor 1, the upstream air-fuel ratio sensor 8, and the control circuit 13 form an engine control system 100 for controlling the engine 11.

The control circuit 13 calculates an air-fuel ratio of the exhaust gas g upstream of the purification device 10, based on an output signal of the upstream air-fuel ratio sensor 8. The control circuit 13 calculates an air-fuel ratio of the exhaust gas g downstream of the purification device 10, based on an output signal of the A/F sensor 1. The control circuit 13 performs feedback control over the engine 11 using these measured air-fuel ratios. In the engine control system 100 of the present embodiment, the engine 11 is roughly controlled based on the air-fuel ratio measured by the upstream air-fuel ratio sensor 8. Also, the engine 11 is precisely controlled based on the air-fuel ratio measured by the A/F sensor 1. As a result of the control, the air-fuel ratio of the exhaust gas g is accurately controlled in the engine control system 100. Thus, a high measurement accuracy of air-fuel ratio is required of the A/F sensor 1 of the present embodiment.

The purification device 10 includes a honeycomb structure 101 and a catalyst layer formed on the surface of the honeycomb structure 101. The honeycomb structure 101 is made such as of cordierite, and has multiple cells through which the exhaust gas g passes. The catalyst layer contains a noble metal catalyst such as of Pt or palladium (Pd). When passing through the multiple cells, the exhaust gas g contacts the noble metal catalyst. Thus, the engine control system 100 of the present embodiment is ensured to purify harmful substances, such as NOx or CO, contained in the exhaust gas g.

Advantageous effects of the A/F sensor 1 of the present embodiment will be described. As described above, in the detection part 20 of the A/F sensor 1 of the present embodiment, C-phase ratio is set to 88 mol % or more. With this configuration, the A/F sensor 1 can significantly reduce electrical resistance and thus can reduce variation in electrical resistance of the detection part 20 in the solid electrolyte body 2. Specifically, zirconia crystal includes C phase, M phase, and T phase. M and T phases exhibit high electrical resistance, but C phase exhibits low electrical resistance. Therefore, in the A/F sensor 1, the amount of C phase in the detection part 20 is sufficiently increased, thereby decreasing electrical resistance of the detection part 20. Thus, variation in electrical resistance of the detection part 20 is reduced, and variation in current flowing through the detection part 20 is reduced. Consequently, air-fuel ratio of the exhaust gas g is measured with high accuracy. Thus, in the A/F sensor 1 of the present embodiment, air-fuel ratio of the exhaust gas g can be controlled with higher accuracy, and harmful substances in the exhaust gas g are reduced more.

In the present embodiment, the length L (see FIG. 1) of the measurement electrode 4 in the axial direction of the solid electrolyte body 2 (Z-direction) is 3 mm or less.

Thus, in the present embodiment, the amount of use of the noble metal forming the measurement electrode 4 is reduced, and the cost for manufacturing the A/F sensor 1 is reduced. When the length L is made small, the accuracy of air-fuel ratio tends to decrease. In this regard, since the amount of C phase is set to 88 mol % or more in the present embodiment, the measurement accuracy of air-fuel ratio is enhanced. Thus, the present embodiment achieves both of reduction in the cost of manufacturing the A/F sensor 1 and improvement in the measurement accuracy of air-fuel ratio.

Further, the detection part 20 of the solid electrolyte body 2 of the present embodiment includes C phase at a ratio that is higher by 1 mol % or more than in the rest of the solid electrolyte body 2.

Thus, in the present embodiment, the solid electrolyte body 2 is easily manufactured. That is, when manufacturing the solid electrolyte body 2, the unsintered body 28 (see FIG. 5) is fired as described above to produce the sintered body 29. However, it is difficult to produce a sintered body 29 with a C-phase ratio of 88 mol % or more. It is relatively easy to produce a sintered body 29 with a C-phase ratio of 87 mol % or less. Accordingly, in the present embodiment, for example, a sintered body 29 with a C-phase ratio of 87 mol % is produced, and then the energization step is performed to thereby increase C phase by 1 mol % or more in the detection part 20. Thus, in the present embodiment, a solid electrolyte body 2 having a detection part 20 with a C phase ratio of 88 mol % or more is easily manufactured.

When C phase is increased from 87 mol % to 88 mol % or more as described later, electrical resistance of the detection part 20 is significantly reduced (see FIG. 6). Accordingly, electrical resistance of the detection part 20 is significantly reduced if C-phase ratio of the detection part 20 is increased by 1 mol % or more from 87 mol % that is the ratio in the rest of the solid electrolyte body 2.

The solid electrolyte body 2 of the present embodiment contains 4.5 to 6 mol % of $Y_2O_3$. In the A/F sensor 1 having this configuration, the solid electrolyte body 2 will have a thermal expansion coefficient substantially equal to that of the diffusion layer 211 (see FIG. 1) and that of the porous alumina forming the trap layer 212. Thus, in the present embodiment, thermal stress is unlikely to be applied to the solid electrolyte body 2 when heated by the heater 6.

In the detection part 20 of the present embodiment, C-phase ratio is preferably 95 mol % or less.

When manufacturing the solid electrolyte body 2, C-phase ratio increases with the increase of current applied to the detection part 20. However, trying to achieve C phase of 95 mol % or more, $ZrO_2$ is reduced to zirconium (Zr). Therefore, C-phase ratio is preferably 95 mol % or less.

When measuring air-fuel ratio of the exhaust gas g, the A/F sensor 1 of the present embodiment is ensured to heat the detection part 20 up to 600 to 1000° C. using the heater 6.

If the temperature of the detection part 20 is less than 600° C., electrical resistance of the detection part 20 is not sufficiently reduced as described later. The detection part 20 with a temperature exceeding 1000° C. will create a state where the temperature is excessively high, and thus the strength of the solid electrolyte body 2 will easily decrease. Further, if the temperature of the detection part 20 exceeds 1000° C., power consumption of the heater 6 will be excessively high. Therefore, when measuring air-fuel ratio, the detection part 20 preferably has a temperature of 600 to 1000° C. It is more preferable that temperature of the detection part 20 at the time of measuring air-fuel ratio is 650 to 800° C.

In the present embodiment, the area of the detection part 20 (the area of the measurement electrode 4) is set to 40 $mm^2$ or less. The detection part 20 with an area exceeding 40 $mm^2$ will create a state where the area is excessively large, and therefore the amount of the noble metal used for forming the measurement electrode 4 will easily increase. Thus, the cost of manufacturing the A/F sensor 1 tends to increase. Accordingly, the area of the detection part 20 is preferably 40 $mm^2$ or less.

In the present embodiment, the area of the detection part 20 (the area of the measurement electrode 4) is set to be 20 $mm^2$ or more. Since area varies between measurement electrodes 4 (variation in manufacture), reducing the area to 20 $mm^2$ or less will lead to increasing the influence of the variation. Therefore, variation in electrical resistance will increase in the detection part 20, and measurement accuracy of air-fuel ratio will be easily impaired. For this reason, the area of the detection part 20 is preferably set to 20 $mm^2$ or more.

In the present embodiment, the thickness Th of the detection part 20 is set to 2 mm or less. The detection part 20 with a thickness exceeding 2 mm will create a state where the electrical resistance of the detection part 20 is excessively high, and therefore measurement accuracy of air-fuel ratio will be easily impaired. Accordingly, the thickness Th of the detection part 20 is preferably set to 2 mm or less.

In the present embodiment, the thickness Th of the detection part 20 is set to 0.5 mm or more. The detection part 20 with a thickness Th of less than 0.5 mm will create a state where the strength of the detection part 20 easily decreases as described later. Accordingly, the thickness Th of the detection part 20 is preferably set to 0.5 mm or more.

In the present embodiment, the firing step and the energization step are performed when manufacturing the A/F sensor 1. At the firing step, an unsintered body 28 (see FIG. 5) of the solid electrolyte body 2 is fired to produce a sintered body 29. At the energization step, current is applied across the measurement electrode 4 and the reference electrode 5 formed on the sintered body 29 to achieve a C-phase ratio of 88 mol % or more in the detection part 20. Thus, the solid electrolyte body 2 is formed.

In this way, in the present embodiment, the energization step is performed to easily increase C-phase ratio of the detection part 20. Accordingly, the solid electrolyte body 2 is easily manufactured in the manufacturing method of the present embodiment.

It is more preferable that C-phase ratio of the detection part 20 is set to 88.5 mol % or more. C-phase ratio of 88.5 mol % or more can further reduce variation in electrical resistance of the detection part 20 (see FIG. 6).

As described above, the present embodiment provides the A/F sensor 1 and the method of manufacturing the A/F sensor 1. The A/F sensor 1 is disposed downstream of the purification device 10 in the exhaust gas flow, and is capable of more accurately measuring the air-fuel ratio of exhaust gas.

FIRST EXPERIMENTAL EXAMPLE

An experiment was conducted to confirm advantageous effects of the A/F sensor 1 of the present embodiment. First, in the present experiment, five types of samples of the A/F sensor 1 (Samples 1 to 5) were produced. These samples had different C-phase ratios in the detection part 20 as shown in Table 1 below. Then, the electrical resistance of the detection part 20 was measured for each sample. Based on the measurements of the present experiment, relationship between C-phase ratio and electrical resistance variation was studied.

First, the method of producing the samples will be described. For producing each of Samples 1 to 5, $ZrO_2$ powder and $Y_2O_3$ powder were mixed together first, and then formed into a cup shape, thereby preparing an unsintered body 28 (see FIG. 5) of a solid electrolyte body 2. The unsintered body 28 was ensured to be composed of 94 mol % of $ZrO_2$ and 6 mol % of $Y_2O_3$.

Subsequently, a firing step was performed in this sample production method. For Samples 2 to 5, the unsintered body 28 was fired for 24 hours at a temperature from 1100 to 1185° C. For Sample 1, the unsintered body 28 was fired for 6 hours at the same temperature. Thus, sintered bodies 29 were prepared. When the firing step was performed under the aforementioned conditions, the sintered body 29 of Sample 1 had a C-phase ratio of 86 mol %. The sintered bodies 29 of Samples 2 to 5 had a C-phase ratio of 87 mol %.

In the production method, after firing each unsintered body 28, a measurement electrode 4 and a reference electrode 5 were formed by plating. Thereafter, a diffusion layer 211 was formed on a surface of each sintered body 29 by plasma-spraying, and then a slurry serving as a trap layer 212 was applied to the surface of the sintered body 29, followed by drying and firing.

For Samples 1 and 2, the sintered body 29 was used as it is as a solid electrolyte body 2, omitting the energization step. For Samples 3 to 5, the energization step was performed for the sintered body 29. In this way, C-phase ratio of each detection part 20 was controlled in the sample production method. For example, the sintered body 29 of Sample 5 was heated to 850° C. using the heater 6 while a current of 260 mA was applied across the measurement electrode 4 and the reference electrode 5 for 25 seconds ($1^{st}$ energization), followed by applying a current of 260 mA for 25 seconds at the same temperature with the current direction being reversed ($2^{nd}$ energization). Then, Sample 5 was heated for five minutes at 850° C. by the heater 6 without applying current. When the energization step was performed under these conditions, the C-phase ratio of the detection part 20 increased to 88.5% due to the current. Sample 5 was thus produced. For Samples 3 and 4, the temperature and the current were set to the same values as those of Sample 5, and current application time periods were set to the values shown in Table 1. Samples 3 and 4 were thus produced.

Figure 7:
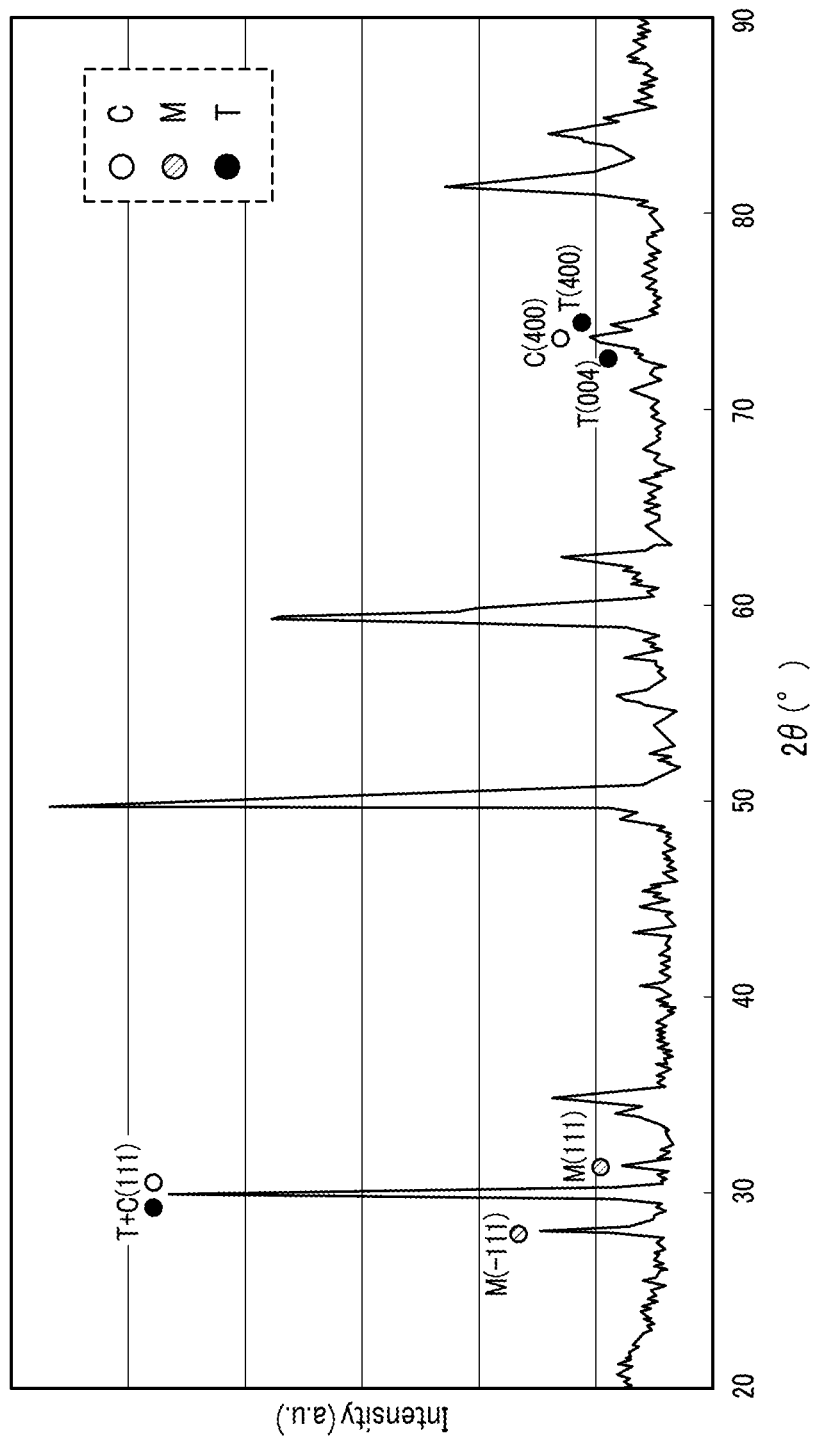
FIG. 7 is a graph showing XRD analysis of the detection part, in a 2θ range of 20° to 90° where θ is an X-ray (Cu Kα) incident angle, according to the first experimental example.

After producing Samples 1 to 5 in the present experiment, C-phase ratio of the detection part 20 of each sample was measured using an X-ray diffraction method (XRD). An X-ray (Cu K α) with a wavelength of 0.15418 nm was used for the measurements. Then, the detection part 20 of each of Samples 1 to 5 was irradiated with the X-ray, and diffraction intensity was measured while the incident angle θ was changed from 2θ=20 to 90°. As a result, as shown in FIG. 7, peaks of C-, M- and T-phase crystal planes were formed at predetermined angles 2θ.

TABLE 1

| | $1^{st}$ Energization Time (s) | $2^{nd}$ Energization Time (s) | C-Phase ratio (%) | Average of Electrical Resistance (Ω) at 700° C. | 3σ (Ω) of Electrical Resistance at 700° C. | Number of Samples |
|---|---|---|---|---|---|---|
| Sample 1 | 0 | 0 | 86 | 429.6 | 29.5 | 5 |
| Sample 2 | 0 | 0 | 87 | 401.2 | 26.7 | 5 |
| Sample 3 | 15 | 15 | 87.5 | 269.3 | 18.6 | 5 |
| Sample 4 | 20 | 20 | 88 | 49.5 | 8.2 | 5 |
| Sample 5 | 25 | 25 | 88.5 | 32.1 | 6.4 | 5 |

Then, in the present experiment, the intensities of the peaks of C-, M- and T-phase crystal planes were measured, and phase ratios of the detection part 20 were calculated using the following Expressions [1] to [3]. In the following expressions, m indicates the intensity of M-phase peak, t indicates the intensity of T-phase peak, c indicates the intensity of C-phase peak, and a numerical value in parentheses indicates the Miller index of the crystal plane. M indicates the M-phase ratio, T indicates the T-phase ratio, and C indicates C-phase ratio.

$$M=\{m(111)+m(-111)\}/\{m(111)+m(-111)+t(111)+c(111)\}\times 100 \quad [1]$$

$$T=(100-M)\times\{(400)+t(004)\}/\{(400)+t(004)+c(400)\} \quad [2]$$

$$C=(100-M)\times c(400)/\{4400)+t(004)+c(400)\} \quad [3]$$

In the present experiment, electrical resistance of the detection part 20 was measured after measurement of C-phase ratio thereof. The electrical resistance of the detection part 20 was measured in a state where the detection part 20 was heated up to 700° C. by the heater 6. Average and 3σ of electrical resistances resulting from measurements in the present experiment are shown in Table 1. FIG. 6 shows a relationship between C-phase ratio and electrical resistance. In the present experiment, the area of the detection part 20 was 28.26 mm², and the thickness thereof was 0.5 mm. The thickness of the measurement electrode 4 was 1.6 μm.

Figure 6:
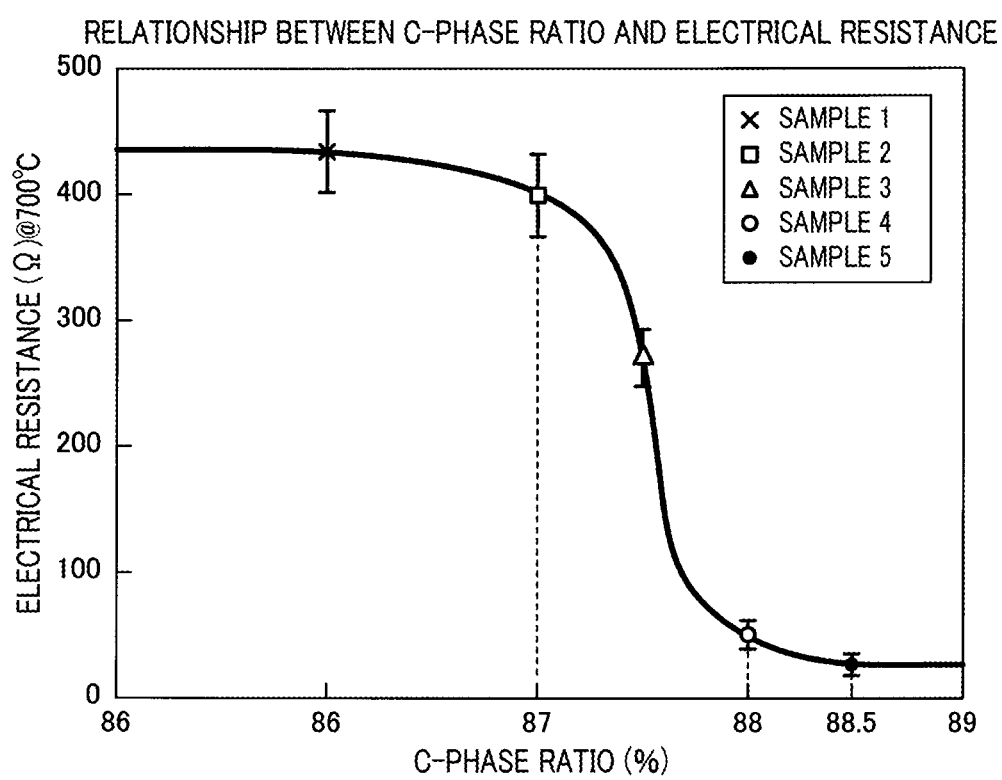
FIG. 6 is a graph showing a relationship between C-phase ratio of a detection part and electrical resistance of the detection part, according to a first experimental example.

FIG. 6 is a graph with the horizontal axis representing C-phase ratio and the vertical axis representing electrical resistance. In FIG. 6, a relationship between C-phase ratio and electrical resistance is plotted, with maximum and minimum values of the electrical resistance being indicated by error bars. Measurements of the present experiment are shown in FIG. 6. As can be seen from FIG. 6, electrical resistance is sufficiently low when C-phase ratio of the detection part 20 is 88 mol % or more, and variation in electrical resistance is small. Thus, from the measurements of the present experiment, it will be understood that use of the A/F sensor 1 having the detection part 20 with a C-phase ratio of 88 mol % or more reduces variation in current flowing through the detection part 20 when measuring the air-fuel ratio, and air-fuel ratio can be accurately measured. Accordingly, it is understood that the A/F sensor 1 of the present embodiment can accurately control the air-fuel ratio of the exhaust gas g and can reduce harmful substances in the exhaust gas g.

SECOND EXPERIMENTAL EXAMPLE

An experiment was conducted to confirm a relationship between temperature and electrical resistance of the detection part 20 of the A/F sensor 1. First, in the present experiment, several samples of the A/F sensor 1 were produced through steps similar to those of the first experimental example. C-phase ratios of the detection part 20 in the respective samples were set to 85, 85.5, 86, 86.5, 87, 87.5, 88, 88.5, and 89 mol %. These samples were heated to 500° C., 600° C., 700° C., 800° C., 900° C., and 1000° C. by the heater 6 and electrical resistance of the detection part 20 at each temperature was measured. Area and thickness of the detection part 20 in each sample were set to 28.26 mm² and 0.5 mm, respectively.

Figure 8:
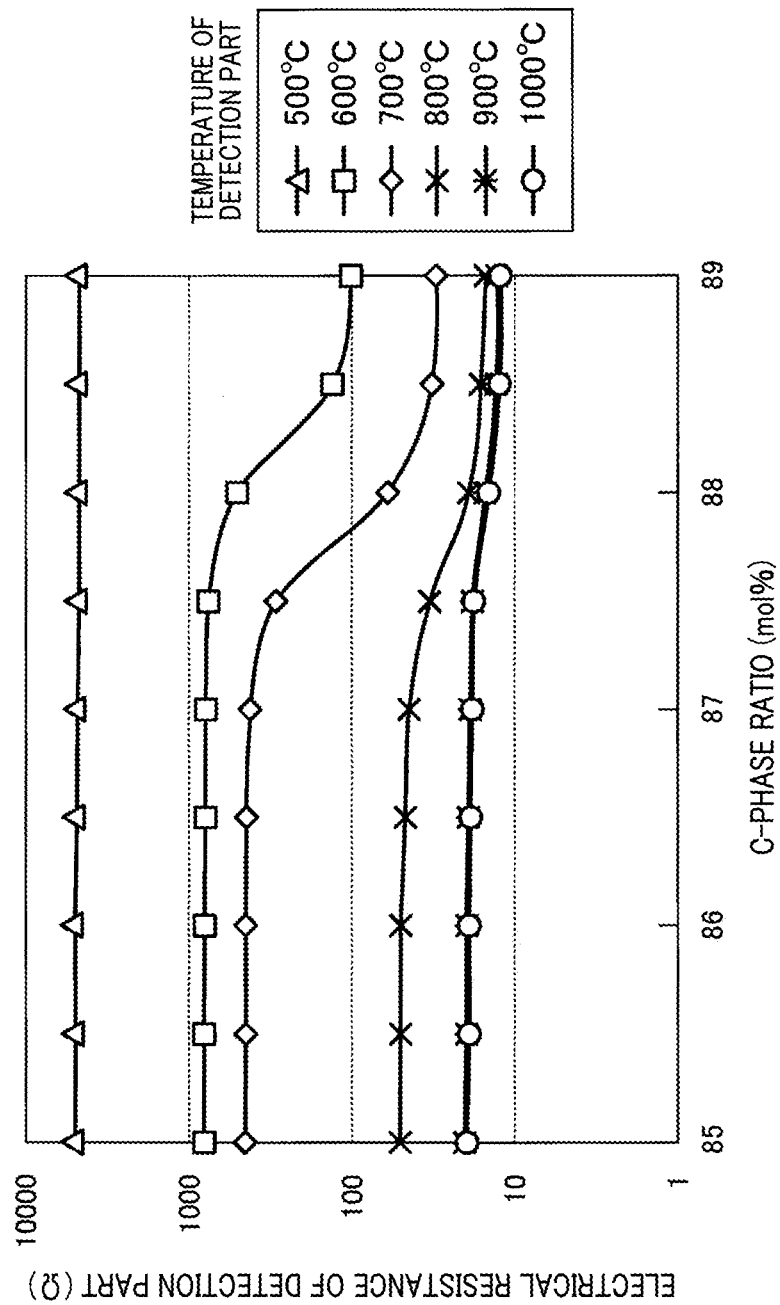
FIG. 8 is a graph showing a relationship between electrical resistance, C-phase ratio and temperature of the detection part, according to a second experimental example.

Measurements of the present experiment are shown in FIG. 8. As shown in FIG. 8, when temperature of the detection part 20 is 500° C., electrical resistance of the detection part 20 is high regardless of the C-phase ratio. When temperature of the detection part 20 is 600° C. or more and C-phase ratio is 88 mol % or more, electrical resistance of the detection part 20 is significantly reduced.

As can be seen from FIG. 8, electrical resistance of the detection part 20 is substantially the same between 900° C. and 1000° C. From the measurements of the present experiment, it is understood that electrical resistance is not reduced any more if the detection part 20 is heated to 1000° C. or more. As described above, when the detection part 20 is heated up to 1000° C. or more, the detection part 20 tends to decrease its strength and the heater 6 tends to increase power consumption. Therefore, when measuring air-fuel ratio, temperature of the detection part 20 is preferably set to 1000° C. or less.

THIRD EXPERIMENTAL EXAMPLE

An experiment was conducted to confirm a relationship between area and electrical resistance of the detection part 20 of the A/F sensor 1. First, in the present experiment, several samples of the A/F sensor 1 were produced through steps similar to those of the first experimental example. C-phase ratios and areas of the detection part 20 in the samples were determined as follows. As in the second experimental examples, C-phase ratios of the samples were respectively set to 85, 85.5, 86, 86.5, 87, 87.5, 88, 88.5, and 89 mol %. Areas of the detection part 20 were set to 20, 25, 28, 30, and 40 mm². The detection part 20 of each sample was heated up to 700° C. by the heater 6. In this state, electrical resistance of each detection part 20 was measured. Thickness of the detection part 20 of each sample was set to 0.5 mm.

Figure 9:
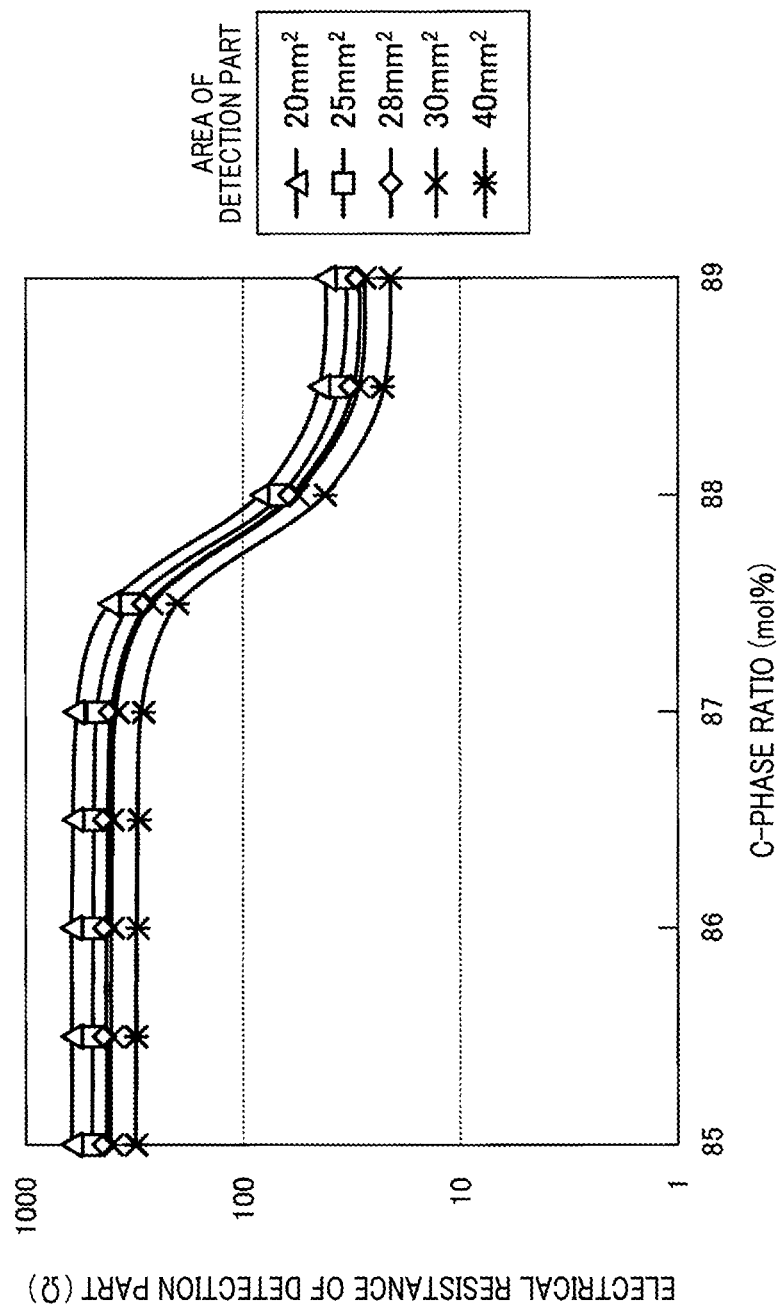
FIG. 9 is a graph showing a relationship between electrical resistance, C-phase ratio and area of the detection part, according to a third experimental example.

Measurements of the present experiment are shown in FIG. 9. As can be seen from FIG. 9, electrical resistance of the detection part 20 is reduced more as the detection part 20 has a larger area. However, when the area of the detection part 20 is larger than 40 mm², the area of the measurement electrode 4 increases as described above, and the amount of use of the noble metal forming the measurement electrode 4 increases. Therefore, the cost of manufacturing the A/F sensor 1 increases. As mentioned above, area varies between measurement electrodes 4 (variation in manufacture). Thus, when the detection part 20 (measurement electrode 4) has an area smaller than 20 mm², the influence of the variation increases. As a result, variation in electrical resistance of the detection part 20 increases, and measurement accuracy of air-fuel ratio is easily impaired. Therefore, the area of the detection part 20 is preferably set to 20 to 40 mm².

FOURTH EXPERIMENTAL EXAMPLE

An experiment was conducted to confirm a relationship between thickness and electrical resistance of the detection part 20 of the A/F sensor 1. First, in the present experiment, several samples of the A/F sensor 1 were produced through steps similar to those of the first experimental example. C-phase ratio and thickness of the detection part 20 in the samples were determined as follows. As in the second experimental examples, C-phase ratios of the samples were respectively set to 85, 85.5, 86, 86.5, 87, 87.5, 88, 88.5, and 89 mol %. Thicknesses of the detection part 20 were set to 0.5, 0.8, 1.0, 1.5, and 2.0 mm. The detection part 20 of each sample was heated up to 700° C. by the heater 6. In this state, electrical resistance of each detection part 20 was measured. The area of the detection part 20 of each sample was set to 28.26 mm².

Figure 10:
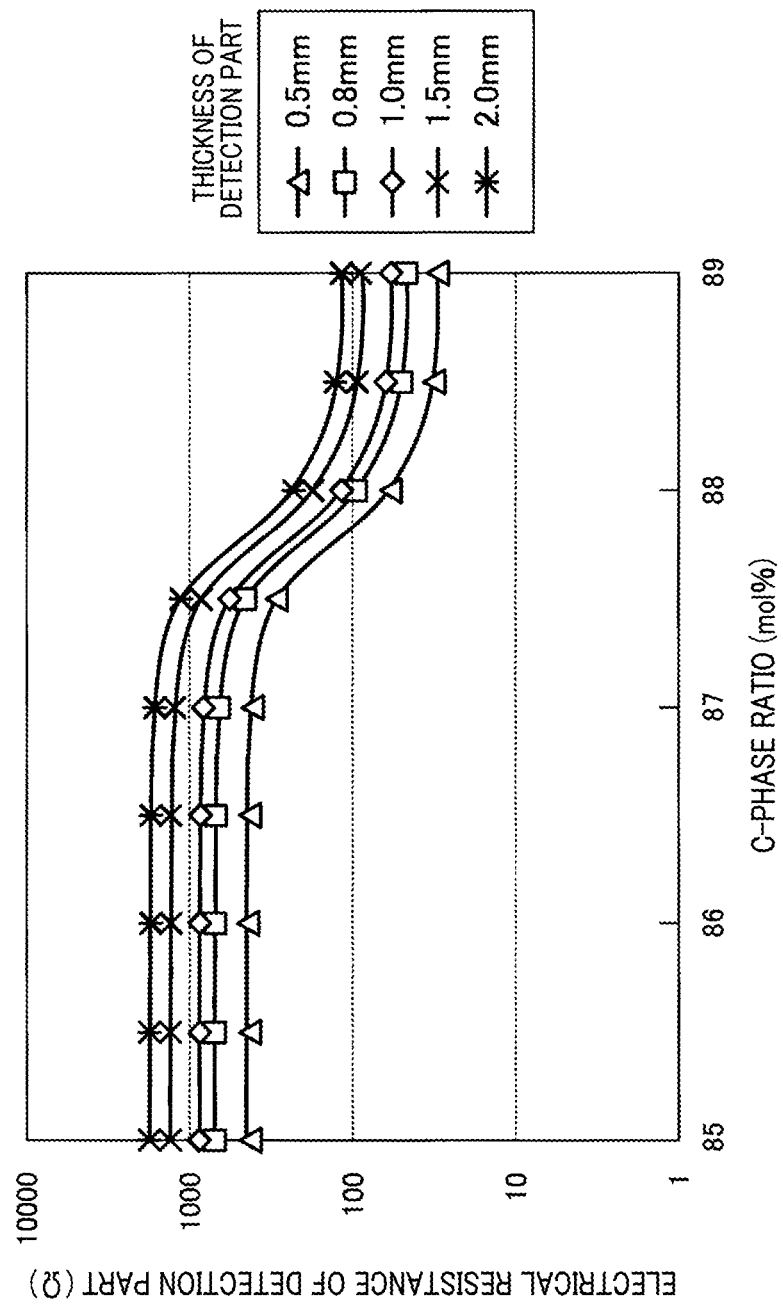
FIG. 10 is a graph showing a relationship between electrical resistance, C-phase ratio and thickness of the detection part, according to a fourth experimental example.

Measurements of the present experiment are shown in FIG. 10. As can be seen from FIG. 10, electrical resistance of the detection part 20 increases as the detection part 20 has a larger thickness. The detection part 20 with a thickness exceeding 2 mm will create a state where electrical resistance and its variation in the detection part 20 are excessively high Thus, air-fuel ratio of the exhaust gas g is unlikely to be accurately measured. If the thickness of the detection part 20 is less than 0.5 mm, the strength of the detection part 20 tends to decrease. Thus, the thickness of the detection part 20 is preferably set in a range of 0.5 to 2 mm.

FIFTH EXPERIMENTAL EXAMPLE

An experiment was conducted to confirm a relationship between bending strength and temperature of the solid electrolyte body 2 of the A/F sensor 1. First, in the present experiment, several samples of the solid electrolyte body 2 were produced through steps similar to those of the first experimental example. The thickness of the solid electrolyte body 2 was set to 0.5 mm. A four-point bending test was conducted for the solid electrolyte bodies 2 of the respective samples. In the present experiment, the maximum stress (bending strength) applied to the solid electrolyte body 2 until breakage of the solid electrolyte body 2 was measured. The present experiment was conducted at room temperature (about 25° C.), 600° C., 800° C., and 1000° C.

In the present experiment, eight samples were used for each temperature. The bending strength at each temperature was evaluated, and the bending strength at a failure probability of 90%, 50%, 10%, 1%, 0.1%, 0.01%, 0.001% and 0.0001% was calculated from Weibull plot. A graph was drawn based on the calculations.

FIG. 11 shows the calculations of the present experiment. As can be seen from FIG. 11, bending strength decreases as the temperature of the solid electrolyte body 2 increases. In particular, when the temperature of the solid electrolyte body 2 is around 1000° C., the bending strength is not more than half the bending strength at room temperature. Thus, when measuring air-fuel ratio using the A/F sensor 1, temperature of the solid electrolyte body 2 is preferably set to 1000° C. or less.

REFERENCE SIGNS LIST

1 A/F sensor
10 Purification device
2 Solid electrolyte body
20 Detection part
3 Reference gas chamber
4 Measurement electrode
5 Reference electrode
6 Heater

The invention claimed is:

1. An A/F sensor disposed downstream of an exhaust gas purification device in an exhaust gas flow to measure an air-fuel ratio of the exhaust gas, comprising:
   a cup-shaped solid electrolyte body closed at a tip end and opened at a base end;
   a reference gas chamber formed inside the solid electrolyte body for introduction of reference gas;
   a measurement electrode formed on an outer surface of the solid electrolyte body to be in contact with the exhaust gas;
   a reference electrode formed on an inner surface of the solid electrolyte body to be in contact with the reference gas; and
   a heater disposed in the reference gas chamber to heat the solid electrolyte body, wherein:
   the solid electrolyte body is made of zirconia;
   the solid electrolyte body includes a detection part interposed between the measurement electrode and the reference electrode to conduct oxygen ions;
   the detection part has a cubic phase ratio of 88 mol % or more and 95 mol % or less, wherein the cubic phase ratio is a ratio of the cubic phase to all phases included in the zirconia crystal; and
   the detection part of the solid electrolyte body includes cubic phase at a ratio that is higher by 1 mol % or more than in the rest of the solid electrolyte body.

2. The A/F sensor according to claim 1, wherein the measurement electrode has a length of 3 mm or less in an axial direction of the solid electrolyte body.

3. The A/F sensor according to claim 1, wherein the solid electrolyte body contains $Y_2O_3$ in a range of 4.5 to 6 mol %.

4. The A/F sensor according to claim 1, wherein the detection part is configured to be heated by the heater in a temperature range of 600 to 1000° C. when measuring an air-fuel ratio of the exhaust gas.

5. The A/F sensor according to claim 1, wherein the detection part has an area of 40 $mm^2$ or less.

6. The A/F sensor according to claim 1, wherein the detection part has a thickness of 2 mm or less.

7. A method of manufacturing an A/F sensor disposed downstream of an exhaust gas purification device in an exhaust gas flow to measure an air-fuel ratio of the exhaust gas,
the A/F sensor comprising:
   a cup-shaped solid electrolyte body closed at a tip end and opened at a base end;
   a reference gas chamber formed inside the solid electrolyte body for introduction of reference gas;
   a measurement electrode formed on an outer surface of the solid electrolyte body to be in contact with the exhaust gas;
   a reference electrode formed on an inner surface of the solid electrolyte body to be in contact with the reference gas; and
   a heater disposed in the reference gas chamber to heat the solid electrolyte body, wherein: the solid electrolyte body is made of zirconia;
   the solid electrolyte body includes a detection part interposed between the measurement electrode and the reference electrode to transfer oxygen ions; and
   the detection part has a cubic phase ratio of 88 mol % or more and 95 mol % or less, wherein the cubic phase ratio is a ratio of the cubic phase to all phases included in the zirconia crystal,
the method comprising:
   a step of firing an unsintered body of the solid electrolyte body to produce a sintered body;
   a step of forming the measurement electrode and the reference electrode in the sintered body, a step of forming the reference electrode on the inner surface of the solid electrolyte body, and a step of disposing the heater in the reference gas chamber to heat the solid electrolyte body; and
   a step of applying current across the measurement electrode and the reference electrode formed on the sintered body while the sintered body is heated by the heater to increase ratio of the cubic phase to 88 mol % or more and 95 mol % or less in the detection part.

8. The method of manufacturing the A/F sensor according to claim 7, wherein the detection part of the solid electrolyte body includes cubic phase at a ratio that is higher by 1 mol % or more than in the rest of the solid electrolyte body.

9. The method of manufacturing the A/F sensor according to claim 7, wherein the measurement electrode has a length of 3 mm or less in an axial direction of the solid electrolyte body.

10. The method of manufacturing the A/F sensor according to claim 7, wherein the solid electrolyte body contains $Y_2O_3$ in a range of 4.5 to 6 mol %.

11. The method of manufacturing the A/F sensor according to claim 7, wherein the detection part is heated by the heater in a temperature range of 600 to 1000° C. when measuring an air-fuel ratio of the exhaust gas.

12. The method of manufacturing the A/F sensor according to claim 7, wherein the detection part has an area of 40 $mm^2$ or less.

13. The method of manufacturing the A/F sensor according to claim 7, wherein the detection part has a thickness of 2 mm or less.

* * * * *